Sept. 29, 1959 D. PITMAN ET AL 2,907,012

SOFAR ALARM

Filed Dec. 30, 1955

INVENTOR.
DUNCAN PITMAN
DAVID F. RUTLAND
BY GEORGE J. GIEL

George Lipkin
George E. Pearson
ATTORNEYS

United States Patent Office 2,907,012
Patented Sept. 29, 1959

2,907,012
SOFAR ALARM

Duncan Pitman, David F. Rutland, and George J. Giel, Los Angeles County, Calif., assignors, by mesne assignments, to the United States of America as represented by the Secretary of the Navy Application December 30, 1955, Serial No. 556,762

3 Claims. (Cl. 340—213)

This invention relates to alarm systems and more particularly to apparatus for sounding an alarm in response to the reception of compressional wave energy having predetermined characteristics, which wave energy is received together with a varying level background noise.

In the system known as Sofar, which is used for locating distress signals at sea, a survivor of a wreck, crash or other vessel in distress will detonate an explosive beneath the water surface. A plurality of hydrophones established at spaced remote stations each receives the compressional wave energy from the signal explosion and indicates the bearing of the source of the signal. By triangulation, the location of the signal explosion may be accurately ascertained and rescue operations may be expeditiously initiated. Since the receiving stations must remain in constant operation the desirability of an automatic alarm for use at the sofar station is immediately apparent. In order to relieve the burden of constant human vigilance and to free the station operator for other duties during his watch, it is necessary to provide equipment which will alert the operator upon reception of a sofar signal with a minimum of false alarms.

The distress signal component of the energy received by the hydrophone must be distinguished from the variable level noise which is constantly present in the water if operation of the alarm in response to increased noise level is to be obviated. This distinction can be achieved through manual control of the threshold level of the apparatus by an operator who is provided with equipment to measure the noise level. Such an arrangement again presents the problem of constant vigilance.

The present invention provides apparatus which automatically sounds an alarm if the signal from a sofar beach amplifier exceeds background noise by a certain amplitude for a certain time. The device automatically adjusts for variations in amplitude of background noise. The signals fed to the input of the apparatus of this invention comprise A.-C. signals having varying frequencies. These signals may be considered as having two components. One component, background noise, changes its average amplitude relatively slowly although it may contain sharp amplitude peaks of short duration. The other component, the distress signal, rapidly increases in amplitude and has a relatively long duration. This duration may have a minimum (such as two seconds, for example) which is determined by various components of the sofar system. It is this difference in rate of change of amplitude together with the known minimum distress signal duration which are utilized to prevent spurious alarms. The incoming signal is full wave rectified and differentiated. The time constant of the differentiator is long with respect to the period of the lowest frequency input signal whereby a rapid increase in amplitude of the rectified signal will produce a voltage across the differentiator resistor but variations which occur over a longer period will effect substantially no voltage drop across this resistor. The differentiator output above a predetermined rejection level is caused to fire a first trigger device the output of which is fed to a second trigger device through an integrating circuit comprising resistance and capacitance of such time constant that only pulses having a duration greater than a certain minimum will fire the second trigger device. Actuation of the latter operates the alarm.

It is an object of this invention to provide apparatus for discriminating an information signal from background noise.

A further object of this invention is to provide an improved automatic alarm.

Still another object of this invention is the provision of apparatus for operating an indicating device in response to a signal having certain predetermined characteristics.

Another object of this invention is the provision of apparatus which is actuated by a signal having an amplitude which differs from a variable level noise background by a predetermined amount.

Another object of this invention is the provision of apparatus for actuating an alarm in response to a signal above a reference level wherein means is provided for automatically adjusting the reference level in accordance with the level of background noise.

Other objects and many of the attendant advantages of this invention will be readily appreciated as the same becomes better understood by reference to the following detailed description when considered in connection with the accompanying drawings wherein.

Figure 1:
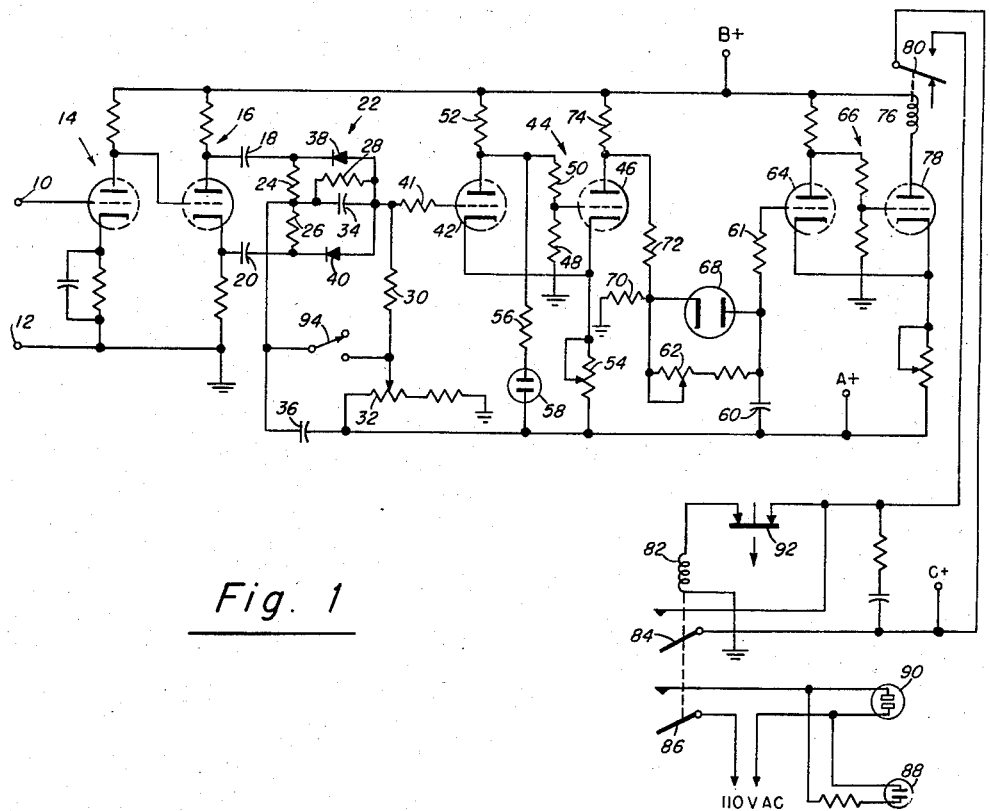
Fig. 1 is a schematic diagram of the circuitry of this invention.

As shown in Fig. 1, the energy wave from a hydrophone and amplifier (not shown) is fed to input terminals 10, 12 of amplifying triode 14 in the form of an A.-C. signal of frequency content which may vary, for example, from 10 to 500 c.p.s. This signal includes the noise background of slowly varying average amplitude and the distress signal component which comprises a relatively rapid increase in amplitude. The output of amplifier 14 is fed to phase inverter amplifier 16 which has its two oppositely phased outputs coupled by means of capacitors 18, 20 to a full wave rectifier 22 comprising resistors 24, 26, 28, 30, variable resistor 32, capacitors 34, 36 and diodes 38, 40 connected as illustrated. The output of this circuit gives an indication of the magnitude of the departure of the distress signal amplitude from the average background noise amplitude as will be explained in connection with Fig. 2. This indication is the D.-C. voltage applied via resistor 41 to the grid of one triode 42 of a first trigger device 44 having a second triode 46 thereof rendered normally conducting by reason of the grid bias produced by voltage divider 48, 50, 52 connected between ground and a regulated positive plate supply potential B which may be, for example, 250 v. Plate to grid coupling between triodes 42, 46 is provided by resistor 50 while a variable common cathode resistor 54 connects both cathodes to a regulated source of positive potential A, lower than B, which may be, for example, 100 v. Resistor 56 and neon tube 58 are series connected between source A and the plate of triode 42.

As soon as the D.-C. voltage applied to triode 42 from rectifier 22 is increased above the normal steady state value that is due to the noise signal, the increase in grid bias gives rise to an increase in plate current and as a direct result an increase in the current flow in the cathode circuit. This increase in cathode current flow increases the voltage drop across the common resistor 54, whereupon the cathode of tube 46 is driven more positive relative to its grounded grid and tube 46 is biased to or near cutoff. In this at or near cutoff condition, there is produced at the plate of triode 46 a large voltage change which has a duration in accordance with the time the rectifier output is above the normal steady state level. This voltage change results in the charging of capacitor 60 of an integrating or time delay circuit through the variable resistor 62 thereof. The output of capacitor 60 is applied via resistor 61 to the grid of one triode 64 of second trigger device 66 which is substantially similar to trigger 44. Plate current will flow in triode 64 when the charge on capacitor 60 reaches the critical value necessary to bias triode 64 to a point at which the voltage drop in the common cathode resistor is sufficient to cause a cut-off bias in triode 78. In turn, the capacitor charge depends upon the values of element 60, 62 and the length of time that a firing voltage is fed to the first trigger 44 from the rectifier 22. In other words the second trigger will operate if the first trigger receives a sufficient voltage for a sufficiently long time (depending on time delay resistor 62) to charge the time delay capacitor 60 to the critical potential. Thus the first trigger determines the amplitude required for operation of the alarm while the second trigger and time delay circuit 60, 62 determine the time the output of the rectifier shall remain above the critical amplitude before the alarm is operated whereby the system is both amplitude and time selective. Diode 68 which is biased by voltage divider 70, 72, 74 is coupled across time delay resistor 62 to provide a low resistance discharge path for the capacitor 60 which decreases the recovery time thereof.

Firing of trigger 66 de-energizes relay coil 76 in the plate circuit of normally conducting triode 78 of the trigger to permit relay contacts 80 to close a circuit between ground and potential source C whereby coil 82 of a second relay is energized to close relay contacts 84, 86. Closing of contacts 86 connects a suitable voltage source to the indicating means which may conveniently comprise a flashing alarm light 88 and an aural device such as a bell (not shown) which may be connected to plug 90. Closing of contacts 84 completes a second circuit for maintaining energization of coil 82 after the distress signal ceases and contacts 80 reopen. This second circuit is broken to terminate actuation of the alarm indicators by manual operation of reset switch 92.

Figure 2:
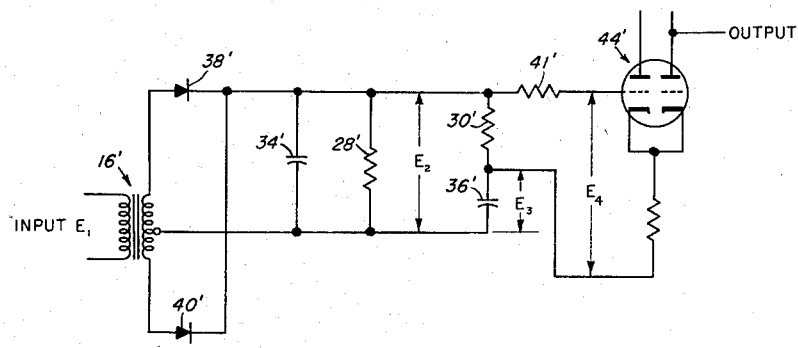
Fig. 2 is a simplified showing of the special rectifier circuit of Fig. 1 redrawn to facilitate explanation of its operation.

Fig. 2 shows the special rectifier circuit of this invention redrawn so as to better describe its operation. Phase inverter 16 (Fig. 1) is replaced by its equivalent, center tapped transformer 16', which supplies out of phase voltages to diodes 38', 40' so that full wave rectification takes place. The full wave rectified voltage appears across resistor 28' and is smoothed by capacitor 34'. The voltage $E_2$ is a measure of the amplitude of the input signal $E_1$ as the time constant of elements 28', 34' is made large (about 3 seconds) compared to the period of the lowest frequency component of $E_1$ (about $\frac{1}{10}$ second). If this voltage were applied directly to the trigger circuit, the latter would fire whenever $E_1$ exceeded a certain value. However, it is not desired to have the alarm sound if $E_1$ is only a steady background noise, no matter how large. To achieve this operation, resistor 30' and capacitor 36' are added as shown. The voltage applied to the trigger is now $E_4$, the difference between $E_2$ and $E_3$, the voltage across resistor 30'. With a steady $E_1$ applied, the capacitor 36' will charge up through resistor 30' until its voltage equals $E_2$. Under these conditions $E_4$ will be zero. If $E_1$ is varied very slowly $E_3$ will follow $E_2$. As $E_1$ is varied more and more rapidly $E_3$ will lag behind $E_2$ due to the time constant of resistor 30' and capacitor 36' and a resultant voltage $E_4$ will develop. Depending on the time constant of resistor 30' and capacitor 36' (approximately 20 seconds), $E_4$ will, with a sufficiently quickly changing $E_1$, exceed the critical potential and fire the trigger. Thus, although $E_2$ can vary a significant amount in a few seconds, $E_3$ will compensate for these variations and will prevent variations which take place in a period long compared with 20 seconds from affecting the alarm.

If automatic operation of the system is not required, manual adjustment of the output of the rectifier is permitted by closing switch 94 (Fig. 1) to obviate the action of capacitor 36. Threshold level is controlled by variable resistor 32 connected between ground and potential source A.

Obviously many modifications and variations of the present invention are possible in the light of the above teachings. It is therefore to be understood that within the scope of the appended claims the invention may be practiced otherwise than as specifically described.

What is claimed is:

1. In an alarm system for receiving an A.-C. energy wave including a signal component and variable level background noise, means for providing full wave rectification of the received energy, differentiating means coupled with said rectifying means and having a time constant long with respect to the period of the lowest frequency of received energy for producing a signal voltage in response to rapid amplitude variation of said rectified energy wave, a first trigger device coupled with said differentiating means for producing an output in response to a differentiated signal voltage of predetermined amplitude, an alarm, a second trigger device for actuating said alarm, and delay means coupling said trigger devices for actuating said second device in response to an output of said first device of predetermined duration.

2. The system of claim 1 wherein said first trigger means includes a normally conducting electronic tube which is rendered substantially non-conducting by said signal voltage of predetermined amplitude, said delay means comprising a capacitor, a resistor coupling the anode of said tube to said capacitor, means for feeding the voltage across said capacitor to said second trigger device, and means for providing a low resistance discharge path for said capacitor.

3. An alarm system adapted to be actuated by received propagated energy signals containing wave components having rapidly varying amplitudes amid background noise components of slowly varying amplitudes comprising in combination means for receiving said signals, means connected to said receiving means for discerning the difference in magnitude between the amplitudes of said rapidly varying wave components and said slowly varying noise components and producing an output signal proportional thereto, said discerning means including means for amplifying said received signals, a phase inverter coupled to said amplifier means for simultaneously producing a first output signal which is in phase with said amplified signals and a second output signal which is of opposite phase therewith, means connected to said phase inverter for rectifying said oppositely phased output signals, and differentiating means having a time constant that is long with respect to the period of the lowest frequency of said received propagated energy signals coupled to said rectifier means for producing a voltage in response to rapid amplitude variations of said rectified signals, said voltage thereby constituting the aforesaid discerning means output signal, a first trigger means connected to said discerning means and responsive to the output signal therefrom for generating a signal of predetermined duration when the aforesaid voltage from said differentiating means reaches a predetermined level, a second trigger means, an alarm coupled to said second trigger means and adapted to be energized thereby, and a delay means interconnecting said first and second trigger means for timely actuating said second trigger means in response to the signal of predetermined duration from said first trigger means.

References Cited in the file of this patent

UNITED STATES PATENTS

| | | |
|---|---|---|
| 1,976,096 | Ryall | Oct. 9, 1934 |
| 2,422,542 | Gustafsson | June 17, 1947 |
| 2,511,855 | Keck | June 20, 1950 |
| 2,695,400 | Snitjer | Nov. 23, 1954 |
| 2,697,824 | Norton et al. | Dec. 21, 1954 |
| 2,722,677 | Krueger | Nov. 1, 1955 |
| 2,742,634 | Bergen et al. | Apr. 17, 1956 |
| 2,749,537 | Loudon | June 5, 1956 |
| 2,762,034 | Joyce et al. | Sept. 4, 1956 |